US012039912B2

(12) United States Patent
Kim et al.

(10) Patent No.: US 12,039,912 B2
(45) Date of Patent: Jul. 16, 2024

(54) DISPLAY APPARATUS AND DRIVING METHOD THEREOF

(71) Applicant: LG Display Co., Ltd., Seoul (KR)

(72) Inventors: Young Ho Kim, Paju-si (KR); Jun Ho Yoo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/986,231

(22) Filed: Nov. 14, 2022

(65) Prior Publication Data

US 2023/0206819 A1 Jun. 29, 2023

(30) Foreign Application Priority Data

Dec. 27, 2021 (KR) ........................ 10-2021-0188751

(51) Int. Cl.
*G09G 3/20* (2006.01)
*G09G 3/3233* (2016.01)

(52) U.S. Cl.
CPC ......... *G09G 3/2096* (2013.01); *G09G 3/3233* (2013.01); *G09G 2310/0286* (2013.01); *G09G 2310/0289* (2013.01); *G09G 2310/08* (2013.01); *G09G 2330/021* (2013.01); *G09G 2340/0435* (2013.01)

(58) Field of Classification Search
None
See application file for complete search history.

(56) References Cited

U.S. PATENT DOCUMENTS

| | | | | |
|---|---|---|---|---|
| 9,087,473 | B1 * | 7/2015 | Walker | G09G 5/18 |
| 2015/0002381 | A1 * | 1/2015 | Fujioka | G09G 3/3614 345/87 |
| 2015/0187334 | A1 * | 7/2015 | Oh | G09G 3/3614 345/204 |
| 2016/0125785 | A1 * | 5/2016 | Wang | G09G 5/391 345/582 |
| 2016/0275916 | A1 * | 9/2016 | Glen | G09G 5/395 |
| 2017/0053620 | A1 * | 2/2017 | Law | G09G 5/395 |
| 2018/0158418 | A1 * | 6/2018 | Ryu | G09G 3/3266 |
| 2022/0101785 | A1 * | 3/2022 | Chung | G09G 3/3233 |
| 2022/0122550 | A1 * | 4/2022 | Ha | G09G 3/3233 |
| 2023/0282162 | A1 * | 9/2023 | Gao | G09G 3/3225 345/214 |

* cited by examiner

*Primary Examiner* — Dorothy Harris
(74) *Attorney, Agent, or Firm* — Fenwick & West LLP

(57) ABSTRACT

A display apparatus includes a display panel including a plurality of pixels variably driven between a first refresh rate and a second refresh rate which is different than the first refresh rate, a processor outputting a frequency variation command signal indicative of a request to switch between the first refresh rate and the second refresh rate, and a timing controller differently controlling a time when a refresh rate of the plurality of pixels changes between the first refresh rate and the second refresh rate based on a temporal position of the frequency variation command signal received from the processor.

18 Claims, 16 Drawing Sheets

[ 15Hz Driving Timing ]

[ Sudden change, Interrupt CASE 1 ]

[ Sudden change, Interrupt CASE 2 ]

[ CMD ahead of ISYNC ]

[ CMD behind ISYNC ]

DISPLAY APPARATUS AND DRIVING METHOD THEREOF

CROSS-REFERENCE TO RELATED APPLICATION

This application claims the benefit of the Republic of Korea Patent Application No. 10-2021-0188751 filed on Dec. 27, 2021, which is hereby incorporated by reference in its entirety.

BACKGROUND

Field of Technology

The present disclosure relates to a display apparatus and a driving method thereof.

Discussion of the Related Art

Variable refresh rate (VRR) is used as one of various functions needed for display apparatuses. The VRR is technology which drives a pixel at a certain refresh rate, and then, increases the refresh rate at a time at which high-speed driving is needed and decreases power consumption, or reduces the refresh rate at a time at which low-speed driving is needed, thereby operating the pixel. A refresh rate may be referred to as a frame rate or a frame frequency.

When a refresh rate varies based on a VRR (for example, when a refresh rate suddenly increases in low-speed driving), an interface timing associated with the transfer of an image signal may be delayed, or a time at which a pixel driving voltage to be supplied to pixels is changed may be delayed, causing image distortion.

SUMMARY

To overcome the aforementioned problem of the related art, the present disclosure may provide a display apparatus and a driving method thereof, which may reduce image distortion caused by a variation of a refresh rate.

To achieve these objects and other advantages and in accordance with the purpose of the disclosure, as embodied and broadly described herein, in one embodiment a display apparatus comprises: a display panel including a plurality of pixels, the plurality of pixels configured to be variably driven between a first refresh rate and a second refresh rate which is different from the first refresh rate; a processor configured to output a frequency variation command signal indicative of a request to switch between the first refresh rate and the second refresh rate; and a timing controller configured to differently control a time when a refresh rate of the plurality of pixels changes between the first refresh rate and the second refresh rate based on a temporal position of the frequency variation command signal received from the processor.

In another embodiment of the present disclosure, a driving method of a display apparatus including a plurality of pixels that are configured to be variably driven between a first refresh rate and a second refresh rate that is different from the first refresh rate, the driving method comprises: outputting, by a processor of the display apparatus, a frequency variation command signal to a timing controller of the display apparatus, the frequency variation command signal indicative of a request to switch between the first refresh rate and the second refresh rate; and differently controlling, by the timing controller, a time when a refresh rate of the plurality of pixels changes between the first refresh rate and the second refresh rate based on a temporal position of the frequency variation command signal received from the processor.

In one embodiment, a display device comprises: a display panel including a plurality of pixels that are configured to be driven between a first refresh rate and a second refresh rate which is different from the first refresh rate, the plurality of pixels driven at the first refresh rate during a first refresh frame during which first image data is applied to the plurality of pixels and during a plurality of skip frames during which the first image data is maintained in the plurality of pixels, the first refresh frame and each of the plurality of skip frames defined by a first synchronization signal; and a timing controller configured to receive a frequency variation control signal indicative of a request to switch between the first refresh rate and the second refresh rate where the request is received during a skip frame that is prior to a last skip frame from amongst the plurality of skip frames, and control a time when a refresh rate of the plurality of pixels changes between the first refresh rate and the second refresh rate based on when the frequency variation control signal is received with respect to a second synchronization signal that is different from the first synchronization signal.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
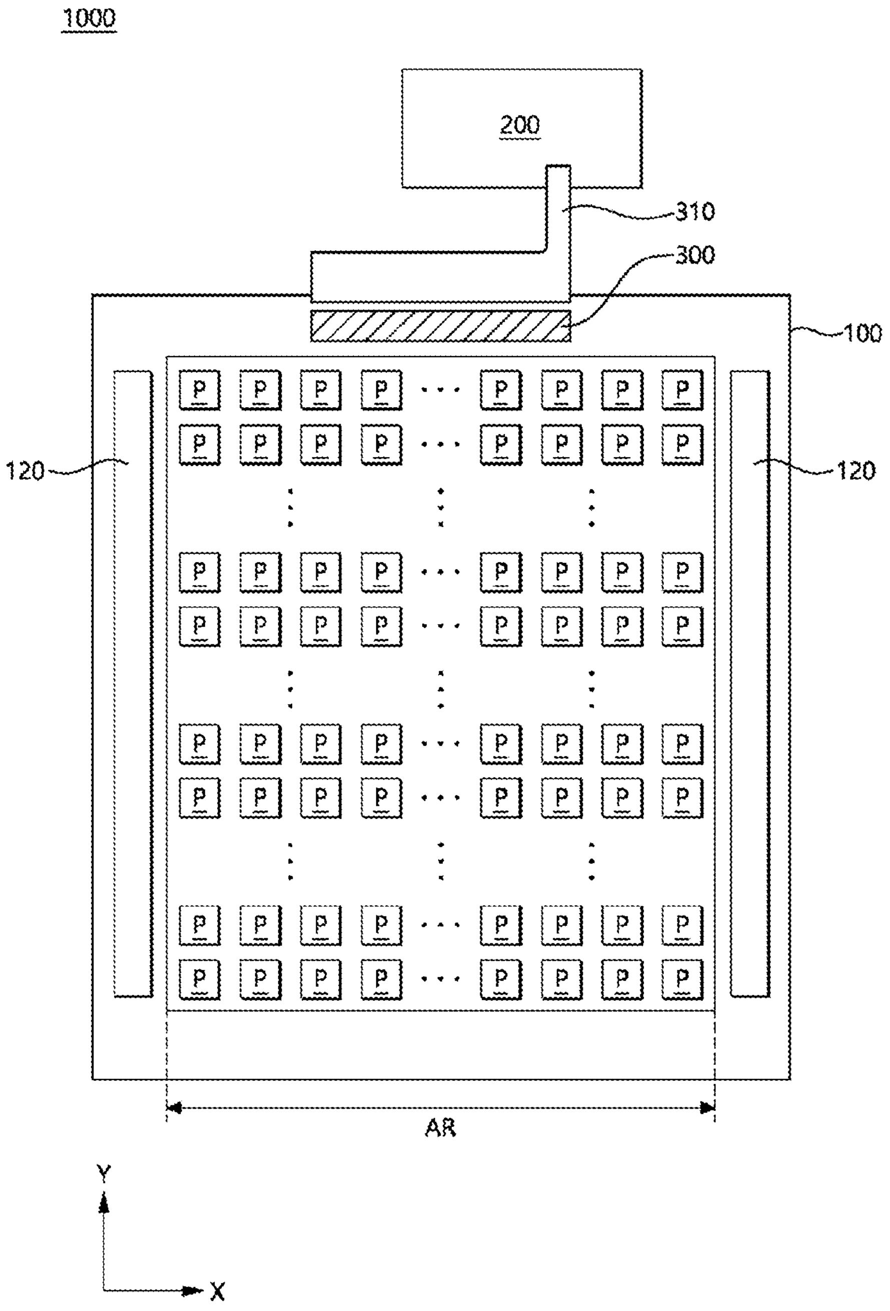
FIG. 1 is a block diagram illustrating a display apparatus according to an embodiment of the present disclosure.

Hereinafter, exemplary embodiments of the present disclosure will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present disclosure, the detailed description will be omitted.

Referring to FIGS. 1 to 4, a display apparatus 1000 according to the present disclosure may be an electroluminescent display apparatus, but is not limited thereto and may be applied to various types of display apparatuses. For example, display apparatuses may be implemented as various types such as liquid crystal display (LCD) apparatuses, electrophoretic display apparatuses, electro-wetting display apparatuses, and quantum dot display apparatuses. In the present embodiment, an electroluminescent display apparatus will be described for convenience.

The display apparatus 1000 according to the present disclosure may include a display panel 100, a plurality of display panel drivers 120 and 300, and a processor 200.

The display panel drivers 120 and 300 may apply input image data to pixels P of a screen AR to display an image on the screen AR. The display panel drivers 120 and 300 may include a gate driver 120 which supplies a gate signal to gate lines GL1 to GL2 of the display panel 100, a data driver 306 which converts image data into voltages of data signals (hereinafter referred to as data voltages) and supplies the data voltages to data lines DL1 to DL6 through data output channels, and a timing controller 303 which controls an operation timing of each of the data driver 306 and the gate driver 120. The data driver 306 and the timing controller 303 may be integrated into a drive integrated circuit (IC) 300. Note that the display panel 100 may include additional gate lines GL and data lines DL than described herein.

The screen AR of the display panel 100 may include the data lines DL1 to DL6, the gate lines GL1 and GL2 which intersect with the data lines DL1 to DL6, and a pixel array where the pixels P are arranged as a matrix type. The pixels P may be arranged in the pixel array as a matrix type defined by the data lines DL1 to DL6 and the gate lines GL1 and GL2. The pixels P may display an image with data voltages applied thereto.

Each of the pixels P may include a plurality of subpixels so as to implement a color. The subpixels may include red (hereinafter referred to as an R subpixel), green (hereinafter referred to as a G subpixel), and blue (hereinafter referred to as a B subpixel). Although not shown, each pixel P may further include a white subpixel.

Each of the subpixels may include an internal compensation circuit which senses an electrical characteristic (for example, a threshold voltage) of a driving element to compensate for a gate voltage of the driving element.

Figure 2:
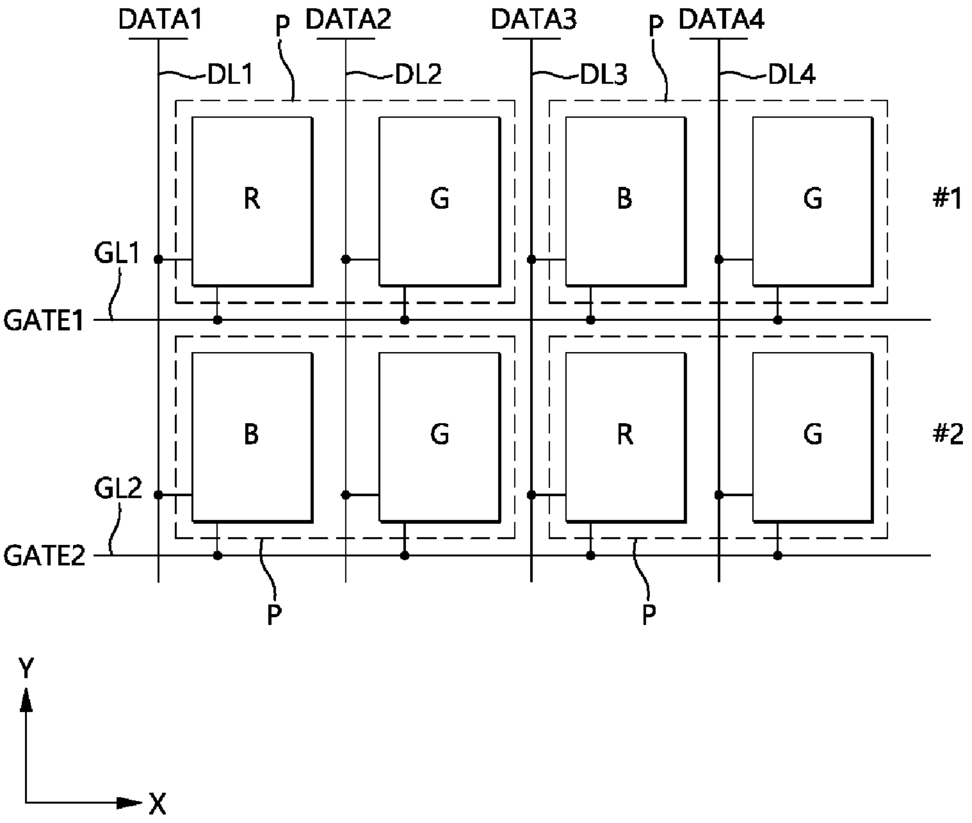
FIG. 2 is a diagram illustrating an example where pixels included in a display panel are arranged according to an embodiment of the present disclosure.

The subpixels may configure a real color pixel P or a pentile pixel P. In the pentile pixel P, as illustrated in FIG. 2, by using a pixel rendering algorithm, two subpixels having different colors may be driven as one pixel P, and thus, may implement a resolution which is higher than a real color pixel in one embodiment. The pixel rendering algorithm may compensate for insufficient color expression in each subpixel by using a color of light emitted from an adjacent subpixel.

Figure 3:
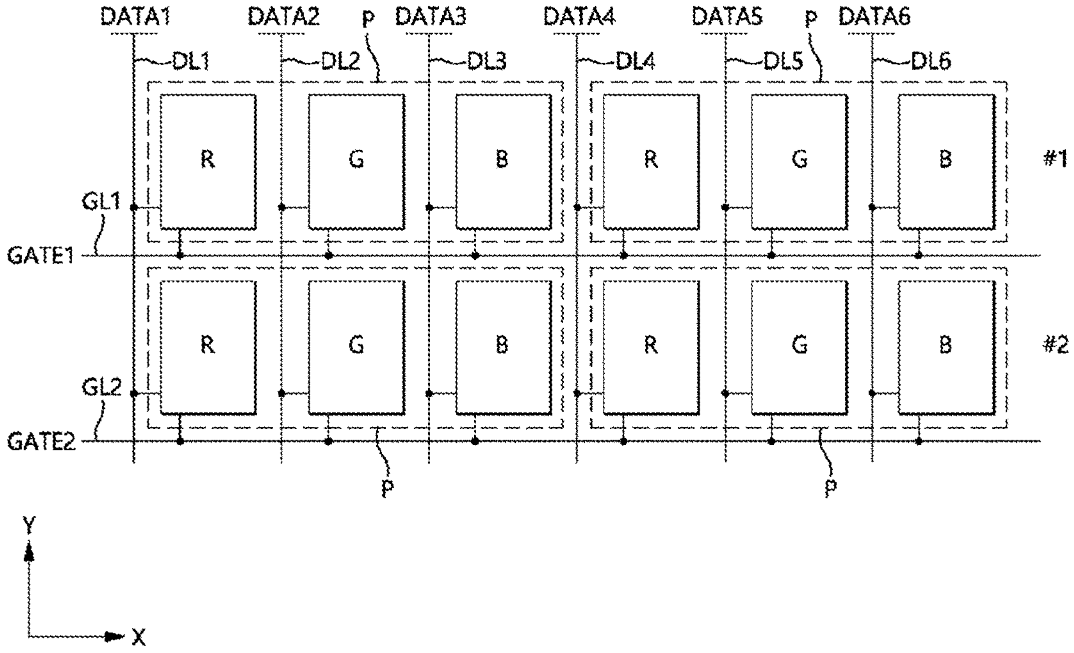
FIG. 3 is a diagram illustrating another example where pixels included in a display panel are arranged according to an embodiment of the present disclosure.

In the real color pixel P, as illustrated in FIG. 3, one pixel P may be configured with R, G, and B subpixels in one embodiment.

When a resolution of the pixel array is n*m, the pixel array may include n number of pixel columns and m number of pixel rows intersecting with the pixel column. In FIGS. 2 and 3, #1 may represent a number of a pixel row, and #2 may represent a number of a pixel row. The pixel column may include pixels P which are arranged in a Y-axis direction. The pixel row may include pixels P which are arranged in an X-axis direction. One horizontal period 1H may denote a time obtained by dividing one frame period by the number of m pixel rows. The gate driver 120 may sequentially output a gate signal up to an $m^{th}$ pixel row from a first pixel row to perform progressive scan on the pixels P by row units. Each of subpixels of one pixel row may operate in the order of an initialization operation, a sensing operation, and a data application operation in one horizontal period.

The pixel array of the display panel 100 may be provided on a glass substrate, a metal substrate, or a plastic substrate. In a plastic panel, the pixel array may be provided on the plastic substrate, and thus, the display panel 100 may be implemented as a flexible panel. The plastic panel may include the pixel array on an organic thin-film film attached on a back plate. A touch sensor array may be provided on the pixel array.

The back plate may be a polyethylene terephthalate (PET) substrate. The organic thin-film film may be formed on the back plate. The pixel array and the touch sensor array may be provided on the organic thin-film film. The back plate may block the penetration of water into the organic thin-film film so that the pixel array is not exposed to humidity. The organic thin-film film may be a thin polyimide (PI) film substrate. A multi-layer buffer layer (not shown) including an insulation material may be formed on the organic thin-film film. Lines for supplying power or a signal applied to the pixel array and the touch sensor array may be formed on the organic thin-film film.

The gate driver 120 may be mounted on the substrate of the display panel 100 along with the pixel array. The gate driver 120 directly provided on the substrate of the display panel 100 has been known as a gate in panel (GIP) circuit.

The gate driver 120 may be disposed at one of a left bezel and a right bezel of the display panel 100 and may supply the gate signal to the gate lines GL1 and GL2, based on a single feeding scheme. In the single feeding scheme, in FIG. 1, one of two gate drivers 120 may not be needed.

The gate driver 120 may be disposed at each of the left bezel and the right bezel of the display panel 100 and may supply the gate signal to the gate lines GL1 and GL2, based on a double feeding scheme. In the double feeding scheme, the gate signal may be simultaneously applied at both ends of one gate line.

The gate driver 120 may be driven at a gate timing signal supplied from the drive IC 300 by using a shift register and may supply gate signals GATE1 and GATE2 to the gate lines GL1 and GL2. The shift register may shift the gate signals GATE1 and GATE2, and thus, may sequentially supply the gate signals GATE1 and GATE2 to the gate lines GL1 and GL2. The gate signals GATE1 and GATE2 may include a scan signal and an emission control signal.

The drive IC 300 may output a gate timing signal for controlling the gate driver 120. The drive IC 300 may be connected to the data lines DL1 to DL6 through the data output channels and may supply data voltages to the data lines DL1 to DL6.

Figure 4:
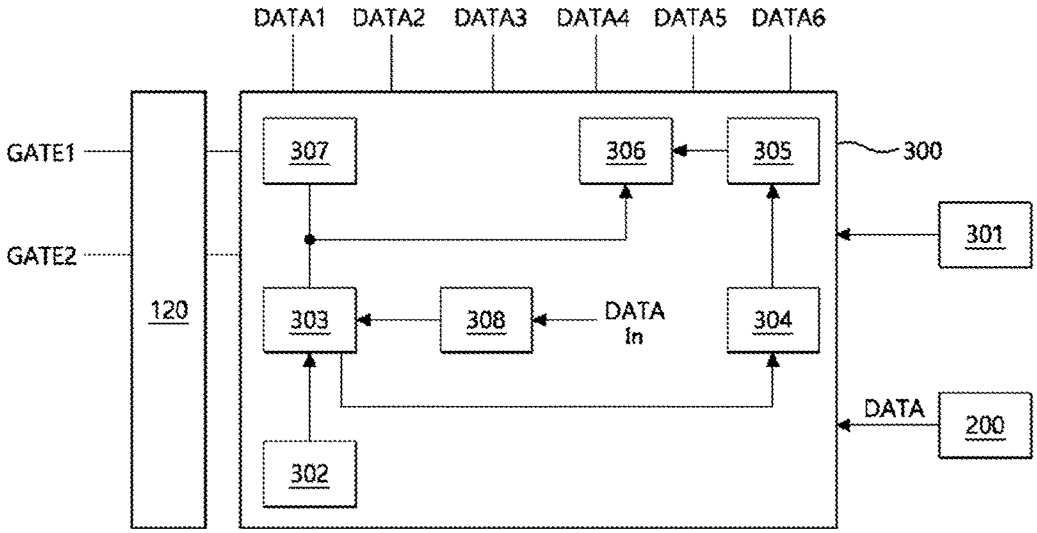
FIG. 4 is a block diagram illustrating a configuration of a drive integrated circuit (IC) illustrated in FIG. 1 according to an embodiment of the present disclosure.

The drive IC 300, as illustrated in FIG. 4, may be connected to the processor 200, a first memory 301, and the display panel 100. The drive IC 300 may include a data calculator 308 (e.g., a circuit), a timing controller 303 (e.g., a circuit), and a data driver 306 (e.g., a circuit). The drive IC 300 may further include a second memory 302, a gamma compensation voltage generator 305 (e.g., a circuit), a power supply 304, and a level shifter 307 (e.g., a circuit).

The data calculator 308 may receive image data DATA from the processor 200 and may modulate the received image data DATA by using a predetermined image quality algorithm, thereby enhancing image quality. The data calculator 308 may include a data recover unit which decodes compressed image data DATA to recover the image data DATA. In one embodiment, the data recover unit is a circuit such as a processor.

The timing controller 303 may supply the data driver 306 with the image data DATA received from the data calculator 308. The timing controller 303 may generate a gate timing signal for controlling the gate driver 120 and a source timing signal for controlling the data driver 306 to control an operation timing of each of the gate driver 120 and the data driver 306. The timing controller 303 may control an operation of the power supply 304.

The power supply 304 may generate power needed for driving of the pixel array of the display panel 100, the gate driver 120, and the drive IC 300 by using a DC-DC converter. The DC-DC converter may include a charge pump, a regulator, a buck converter, and a boost converter. The power supply 304 may adjust an input voltage to generate direct current (DC) powers such as a gamma reference voltage, a gate on voltage VGL, a gate off voltage VGH, a pixel driving voltage ELVDD, a low level source voltage ELVSS, and an initialization voltage Vini.

The gamma reference voltage may be supplied to the gamma compensation voltage generator 305. The gate on voltage VGL and the gate off voltage VGH may be supplied to the level shifter 307 and the gate driver 120. Pixel powers such as the pixel driving voltage ELVDD, the low level source voltage ELVSS, and the initialization voltage *Vini* may be supplied to subpixels in common. Each of the subpixels may include a pixel circuit which includes a light emitting device EL and a driving element DT.

The initialization voltage Vini may be a voltage for initializing main nodes of the pixel circuit. The gate voltage may be se to "VGH=8V" and "VGL=−7V" and the pixel power may be set to "ELVDD=4.6V", "ELVSS=−2V to −3V", and "Vini (or Vref)=−3V to −4V", but the present disclosure is not limited thereto. A data voltage Vdata may be set to "Vdata=2V to 6V", but is not limited thereto.

The initialization voltage Vini may be set to a DC voltage which is less than the data voltage Vdata and is greater than a threshold voltage of the light emitting device EL, and thus, may control the emission of light from the light emitting device EL and may initialize the main nodes of the pixel circuit.

The power supply 304 may vary the low level source voltage ELVSS according to a brightness value DBV, based on control by the timing controller 303, and thus, may limit the maximum luminance of the screen AR implemented through the pixels P.

The level shifter 307 may receive gate timing signals from the timing controller 303 and may shift voltage levels of the gate timing signals. The gate timing signals may include a gate timing signal, such as a start pulse VST and a shift clock GCLK, and a gate voltage such as the gate on voltage VGL and the gate off voltage VGH. The start pulse VST and the shift clock GCLK may swing between the gate on voltage VGL and the gate off voltage VGH.

The level shifter 307 may shift a low level voltage of the gate timing signal, received from the timing controller 303, to the gate on voltage VGL and may shift a high level voltage of the gate timing signal to the gate off voltage VGH. The level shifter 307 may output and supply the gate timing signal and the gate voltages VGH and VGL to the gate driver 120 through output channels.

The data driver 306 may convert image data (a digital signal), received from the timing controller 303, into a gamma compensation voltage by using a digital-to-analog converter (DAC) to output a data voltage. The data voltage output from the data driver 306 may be supplied to the data lines DL1 to DL6 of the pixel array through an output buffer connected to the data channel of the drive IC 300.

The gamma compensation voltage generator 305 may divide the gamma reference voltage from the power supply 304 by using a voltage division circuit to generate a grayscale-based gamma compensation voltage. The gamma compensation voltage may be an analog voltage which is set for each gray level of image data. The gamma compensation voltage output from the gamma compensation voltage generator 305 may be supplied to the data driver 306.

When power is input to the drive IC 300, the second memory 302 may store a register setting value received from the first memory 301. The register setting value may define timings of waveforms and operations of the data driver 306, the timing controller 303, the gamma compensation voltage generator 305, and the power supply 304 and an output voltage level of the power supply 304. The first memory 301 may include flash memory. The second memory 302 may include static random access memory (SRAM).

The processor 200 may be one of a television (TV) system, a set-top box, a navigation system, a personal computer (PC), a home theater system, a mobile system, and a wearable system.

In the mobile system, the processor 200 may be implemented as an application processor (AP). In the mobile system, the processor 200 may transfer input image data to the drive IC 300 through a mobile industry processor interface (MIPI). The processor 200 may be connected to the drive IC 300 through a flexible printed circuit (FPC) 310.

The display apparatus 1000 according to the present disclosure may use variable refresh rate (VRR) technology. The display apparatus 1000 according to the present disclosure may drive the pixels P at a certain refresh rate, and then, may increase the refresh rate at a time at which high-speed driving is needed or may reduce the refresh rate at a time at which low-speed driving is needed or decrease of power consumption is needed, thereby operating the pixels P at either the high-speed driving or low-speed driving. The pixels P may be driven to be switchable between a first refresh rate and a second refresh rate which is greater (e.g., faster) than the first refresh rate. The pixels P may be driven at a low speed at the first refresh rate, or may be driven at a high speed at the second refresh rate.

The processor 200 may output a frequency variation command signal to the drive IC 300 under a predetermined specific condition. In one embodiment, the frequency variation command signal may be divided into a normal type including no interrupt information and an interrupt type including interrupt information. The processor 200 may output a frequency variation command signal of the normal type at a low-speed driving completion time or a high-speed driving completion time, but is not limited thereto. In one embodiment, the predetermined specific condition includes an end of the low-speed driving and an end of the high-speed driving. Thus, the processor 200 outputs the frequency variation command of the normal type under the predetermined specific condition of the end of the low-speed driving or the end of high-speed driving. A timing, at which the frequency variation command signal of the normal type is output from the processor 200, may not be needed to be predefined.

The processor 200 may suddenly output a frequency variation command signal of the interrupt type at a time at which high speed driving is needed, in the middle of performing low-speed driving. Thus, while low-speed driving is being performed and prior to end of the low-speed driving, the processor 200 may output a frequency variation command signal of the interrupt type rather than waiting for the completion of the low-speed driving. While the pixels P is being driven, the frequency variation command signal of the interrupt type may be irregularly output from the processor 200.

The timing controller 303 of the drive IC 300 may determine whether the frequency variation command signal is the normal type or the interrupt type, based on the presence of the interrupt information included in the frequency variation command signal received from the processor 200. When the frequency variation command signal is the normal type, the timing controller 303 may change a refresh rate, which is for driving the pixels P, from the first refresh rate to the second refresh rate at a predetermined time regardless of a reception timing of the frequency variation command signal, or may change the refresh rate from the second refresh rate to the first refresh rate.

In changing the refresh rate according to the frequency variation command signal of the interrupt type, the timing controller 303 may differently control a variation time of the refresh rate on the basis of a temporal position of the frequency variation command signal received from the processor 200, thereby reducing image distortion capable of occurring in varying the refresh rate. Particularly, the timing controller 303 may dualize a synchronization signal which is a criterion in varying the refresh rate and may apply different synchronization signals in the normal type and the interrupt type, and thus, may prevent or at least reduce the occurrence of a problem where an interface timing associated with the transfer of an image signal is delayed or a problem where a variation time of a pixel driving voltage to be supplied to pixels is delayed. This will be described in detail with reference to FIGS. 6 to 17.

Figure 5:
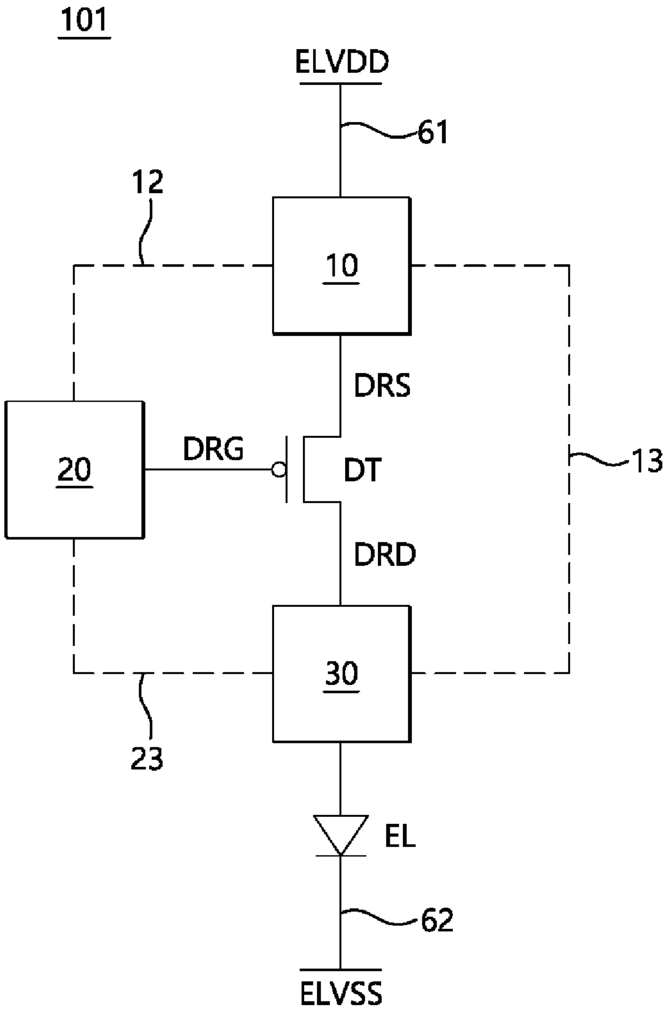
FIG. 5 is a diagram schematically illustrating a pixel circuit of each subpixel according to an embodiment of the present disclosure.

FIG. 5 is a diagram schematically illustrating a pixel circuit of each subpixel according to one embodiment.

Referring to FIG. 5, the pixel circuit may include first to third circuit units 10, 20, and 30 and first to third connection portions 12, 23, and 13. In the pixel circuit, one or more elements may be omitted or added.

The first circuit unit 10 may supply a pixel driving voltage ELVDD to a driving element DT through a line 61. The driving element DT may be implemented as a transistor which includes a gate DRG, a source DRS, and a drain DRD. The second circuit unit 20 may charge a voltage into a capacitor connected to the gate DRG of the driving element DT and may allow the voltage of the capacitor to be held during one frame period. The third circuit unit 30 may supply an anode of the light emitting device EL with a current supplied from the pixel driving voltage ELVDD through the driving element DT, and thus, the current may be converted into light. A cathode of the light emitting device EL is connected with the low level source voltage ELVSS through a line 62. The first to third circuit units 10, 20, and 30 may each include an internal compensation circuit for compensating for a threshold voltage of the driving element DT. The third circuit unit 30 may be connected to a sensing unit which senses a threshold voltage or an electrical characteristic variation of the driving element DT in real time.

The first connection portion 12 may connect the first circuit unit 10 with the second circuit unit 20. The second connection portion 23 may connect the second circuit unit 20 with the third circuit unit 30. The third connection portion 13 may connect the third circuit unit 30 with the first circuit unit 10. Each of the first connection portion 12, the second connection portion 23, and the third connection portion 13 may include one or more transistors and lines.

Figure 6:
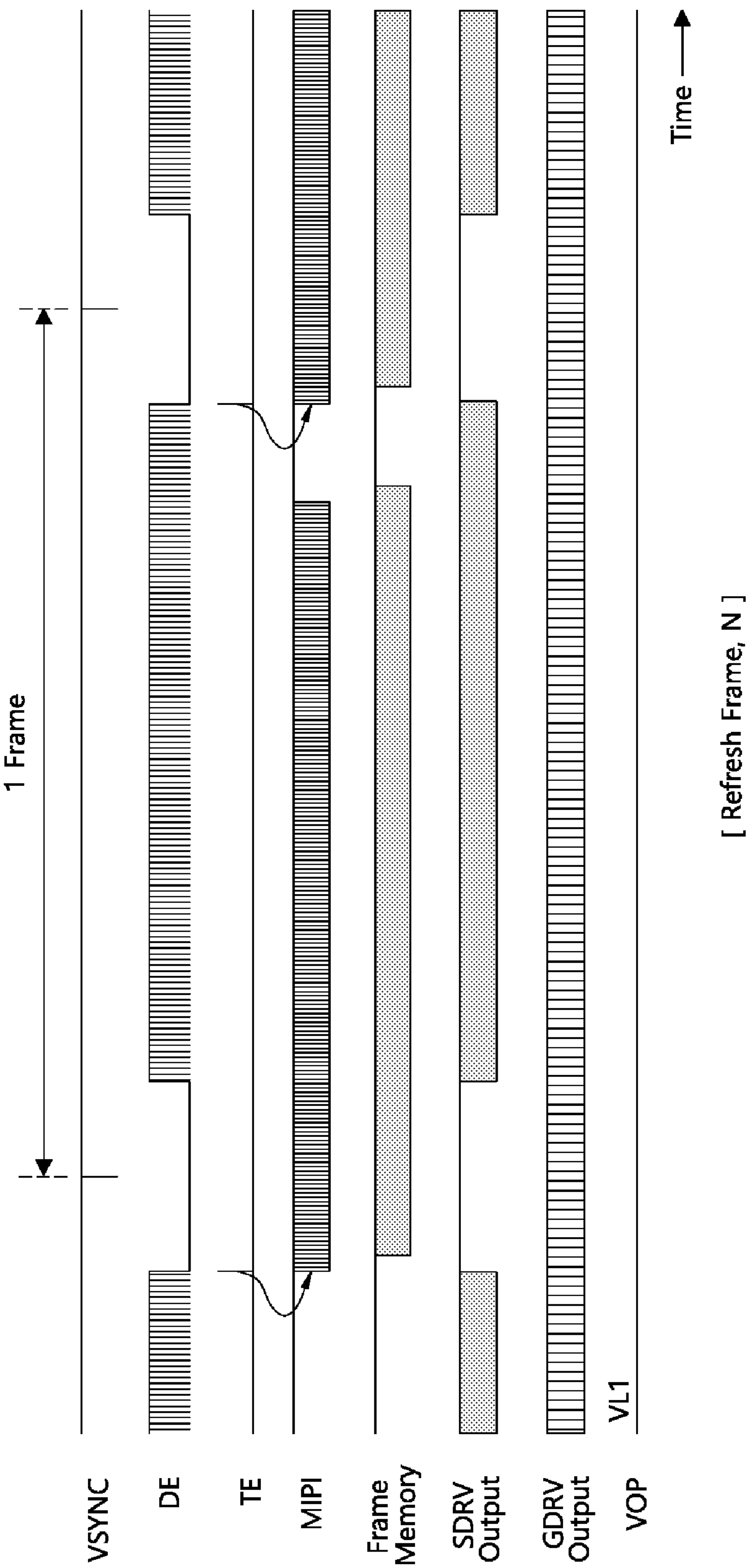
FIG. 6 is a diagram showing a driving timing of a refresh frame according to an embodiment of the present disclosure.
Figure 7:
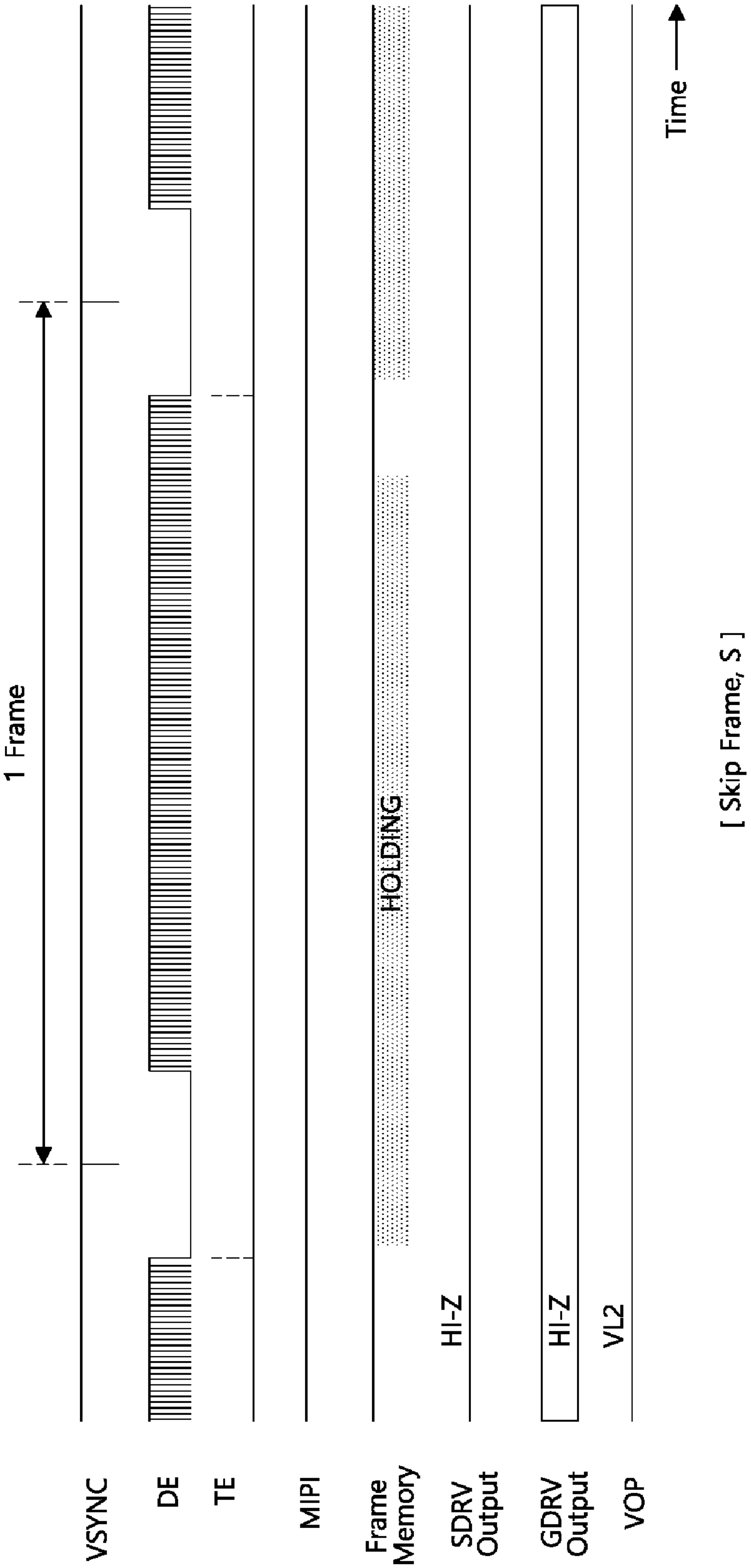
FIG. 7 is a diagram showing a driving timing of a skip frame according to an embodiment of the present disclosure.
Figure 8:
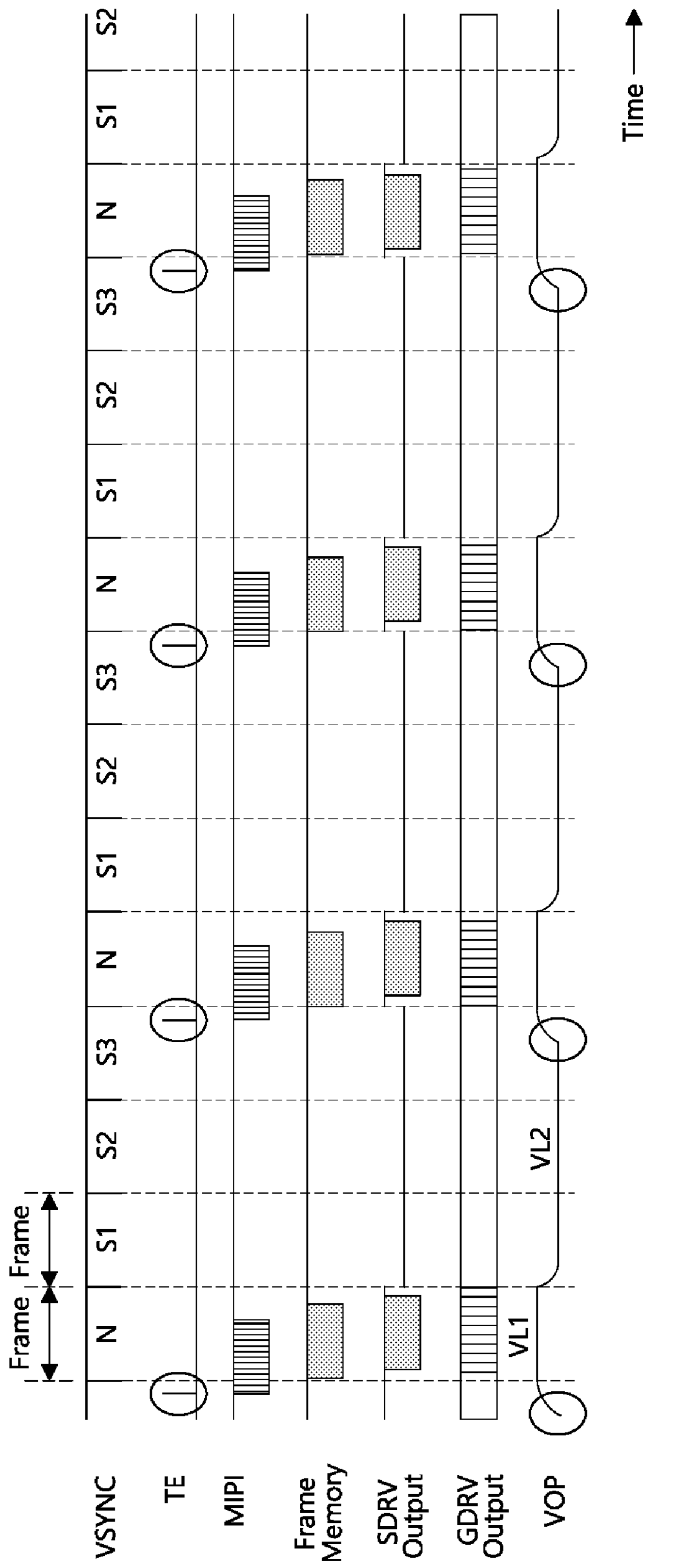
FIG. 8 is a diagram showing a timing at which pixels are driven at a low speed according to an embodiment of the present disclosure.

FIG. 6 is a diagram showing a driving timing of a refresh frame according to one embodiment. FIG. 7 is a diagram showing a driving timing of a skip frame according to one embodiment. FIG. 8 is a diagram showing a timing at which pixels are driven at a low speed according to one embodiment. The reference sign “DE” of FIGS. 6 and 7 is a data enable signal.

Referring to FIGS. 6 to 8, low-speed driving may be technology which skips a pixel application operation and the transfer of image data in some frames to reduce a refresh rate of the image data up to 1 Hz. Two or more skip frames S (for example, S1 to S3) may be arranged between adjacent refresh frames N, for low-speed driving. A low-speed driving refresh rate (hereinafter referred to as a first refresh rate) may be implemented by one refresh frame N (e.g., a first refresh frame) and a plurality of skip frames S differentiated from one another with respect to a vertical synchronization signal VSYNC. A high-speed driving refresh rate (hereinafter referred to as a second refresh rate) may be implemented by each of refresh frames N (e.g., a plurality of second refresh frames) differentiated from one another with respect to the vertical synchronization signal VSYNC. When the second refresh rate is 60 Hz, the first refresh rate may be 15 Hz or less, but this may be merely an embodiment and the inventive concept is not limited to a detailed digit of a refresh rate.

In the refresh frame N, new image data may be provided to pixels of a display panel. A timing controller 303 may transfer a transfer request signal TE to the processor 200 at a specific time of each refresh frame N and may receive new image data, which is for refresh driving in a next refresh frame N, from the processor 200 through the MIPI. The timing controller 303 may store the received image data in a frame memory and may perform an image quality compensation operation, and then, may control an operation of each of a gate driver (GDRV) 120 and a data driver (SDRV) 306 to apply the image data to the pixels. The "HI-Z" of FIG. 7 refers to a circuit output status. The transfer request signal TE may be a signal for preventing a tearing effect and may be generated at a predetermined specific timing with respect to the vertical synchronization signal VSYNC. The processor 200 may transfer image data, needed for the next refresh frame N, to the timing controller 303 in response to the transfer request signal TE. In the refresh frame N, the timing controller 303 may control a pixel driving voltage VOP to a first level VL1. The pixel driving voltage VOP may be a voltage for initializing an anode electrode of a light emitting device configuring each pixel.

In a skip frame S, new image data may not be provided to the pixels of the display panel, and the pixels may maintain a display state of a previous refresh frame N. Also, the frame memory may intactly hold (e.g., maintain) image data of the previous refresh frame N. In skip frames S, because the pixels are skip-driven without updating an image, the timing controller 303 may stop an operation of each of the gate driver GDRV and the data driver SDRV. In the other skip frames S1 and S2 except a last skip frame S3, the timing controller 303 may not transfer the transfer request signal TE to the processor 200. In the last skip frame S3, the timing controller 303 may transfer the transfer request signal TE to the processor 200, for refresh driving of the next refresh frame N. Unlike the refresh frame N, the timing controller 303 may control the pixel driving voltage VOP of the skip frame S to a second level VL2. The second level VL2 may be less than the first level VL1.

In the last skip frame S3, before the timing controller 303 transfers (e.g., outputs) the transfer request signal TE to the processor 200, the processor 200 may transfer the frequency variation command signal of the normal type to the timing controller 303. In the last skip frame S3, a transfer and reception operation between the processor 200 and the timing controller 303 may be regularly performed at a predetermined timing.

In the last skip frame S3, the timing controller 303 may shift the pixel driving voltage VOP from the second level VL2 to the first level VL1, for refresh driving of the next refresh frame N, and thus, a voltage settling time may be sufficiently secured.

Figure 9:
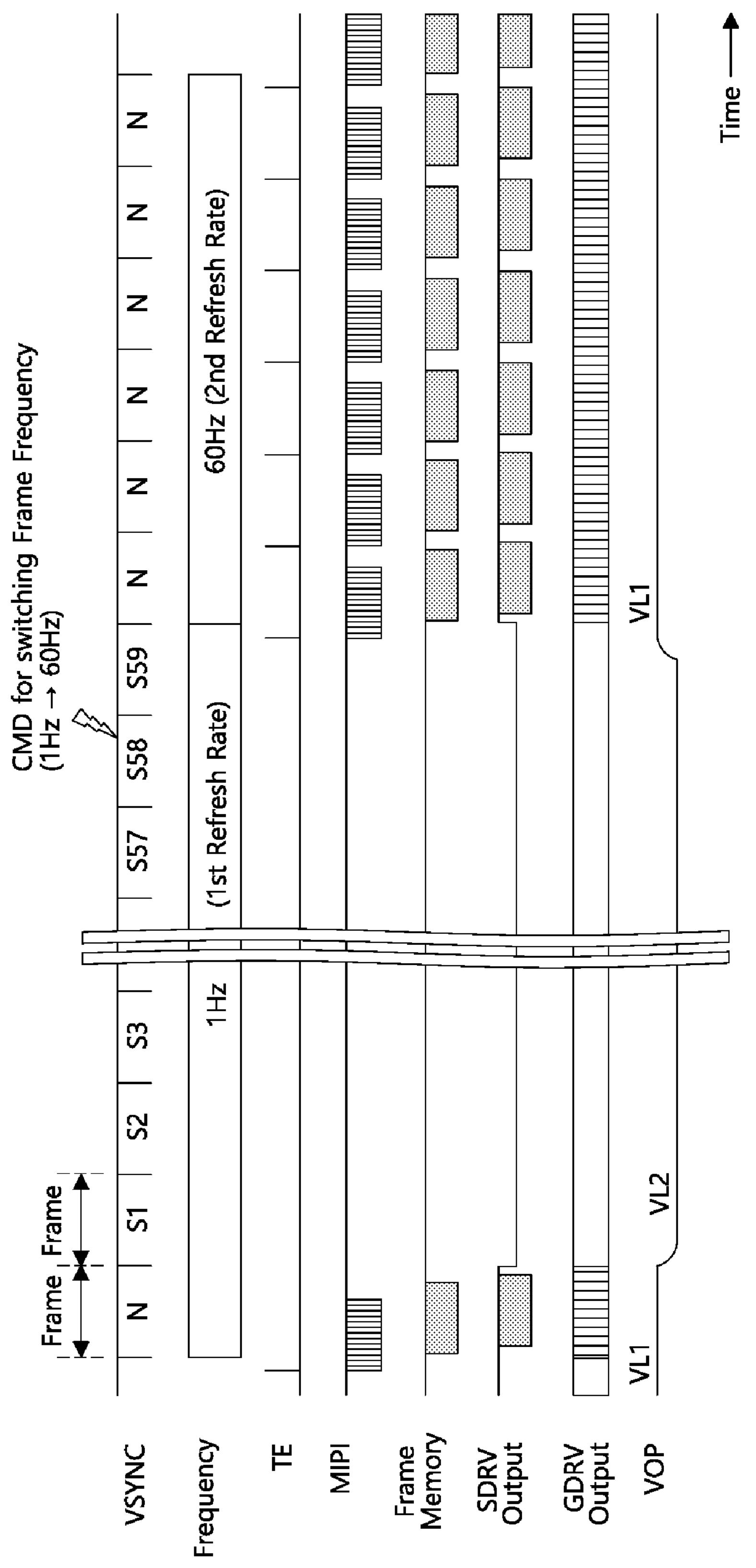
FIG. 9 is a diagram showing a timing at which a refresh rate regularly varies based on a frequency variation command signal of a normal type, according to an embodiment of the present disclosure.

FIG. 9 is a diagram showing a timing at which a refresh rate regularly varies based on a frequency variation command signal of a normal type, according to one embodiment of the present disclosure.

Referring to FIG. 9, a first refresh rate may be set to 1 Hz, and a second refresh rate may be set to 60 Hz. A frequency variation command signal CMD of a normal type may be transferred to a timing controller 303 by a processor 200 at a predetermined timing (for example, in a skip frame S58). In this case, the timing controller 303 may perform a frequency variation operation after a time allocated to the first refresh frame elapses (i.e., after a 1 Hz operation is completed). In other words, the timing controller 303 may perform a frequency variation operation in a skip frame S59 instead of the skip frame S58. In the skip frame S59, based on a vertical synchronization signal VSYNC, the timing controller 303 may transfer, to the processor 200, a transfer request signal TE of the new image data for next refresh driving and may vary a pixel driving voltage VOP, which is to be supplied to pixels, based on refresh driving (VL2 to VL1), and may shift a refresh rate, based on the pixels, from the first refresh rate to the second refresh rate.

Because the first refresh rate and the second refresh rate are alternated in a predetermined order, the timing controller 303 may stably perform a frequency variation operation in S59 which is a last skip frame.

Figure 10:
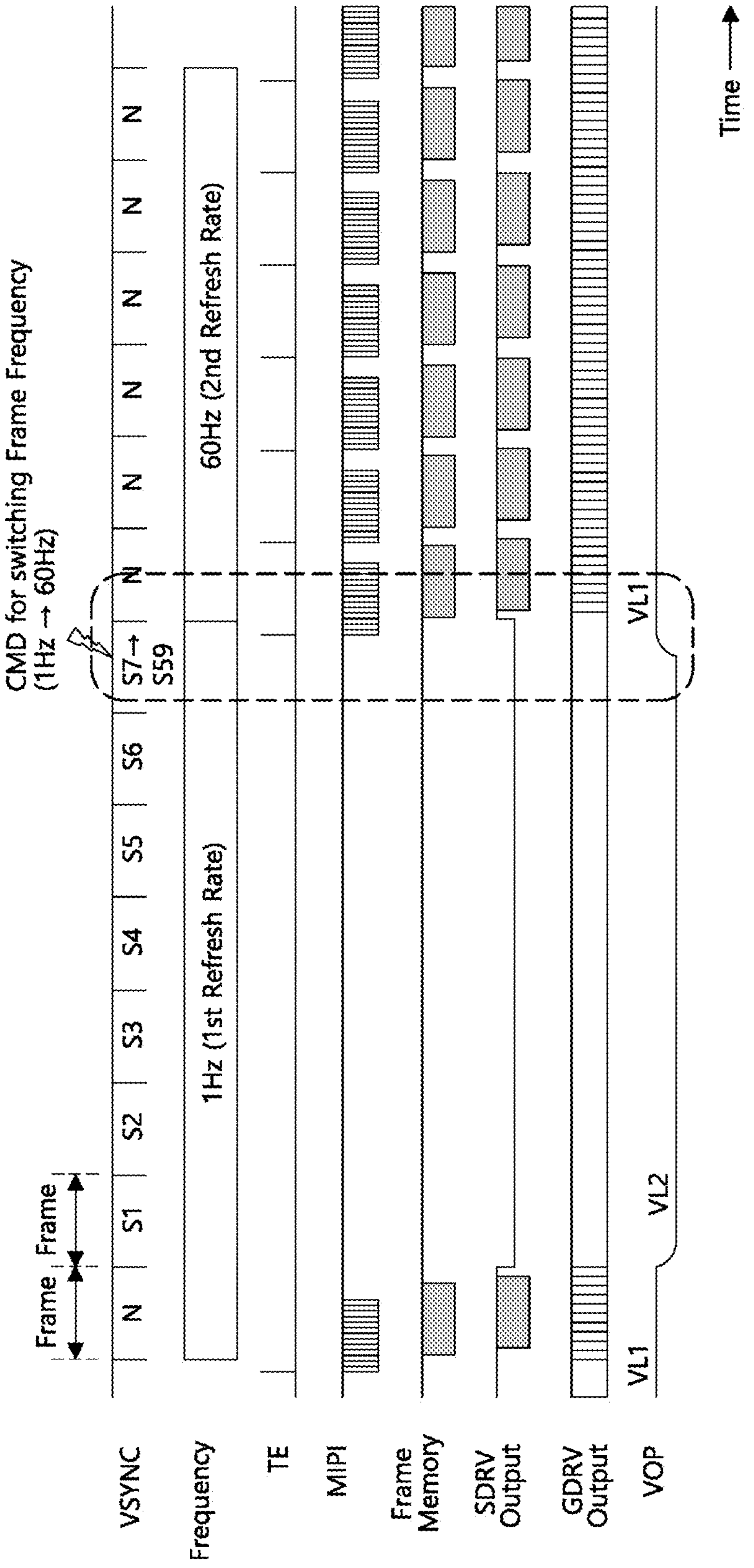
FIG. 10 (PRIOR ART)
FIG. 10 is a diagram showing a timing at which a refresh rate irregularly varies based on a frequency variation command signal of an interrupt type, in a comparative example of the present disclosure.
Figure 11:
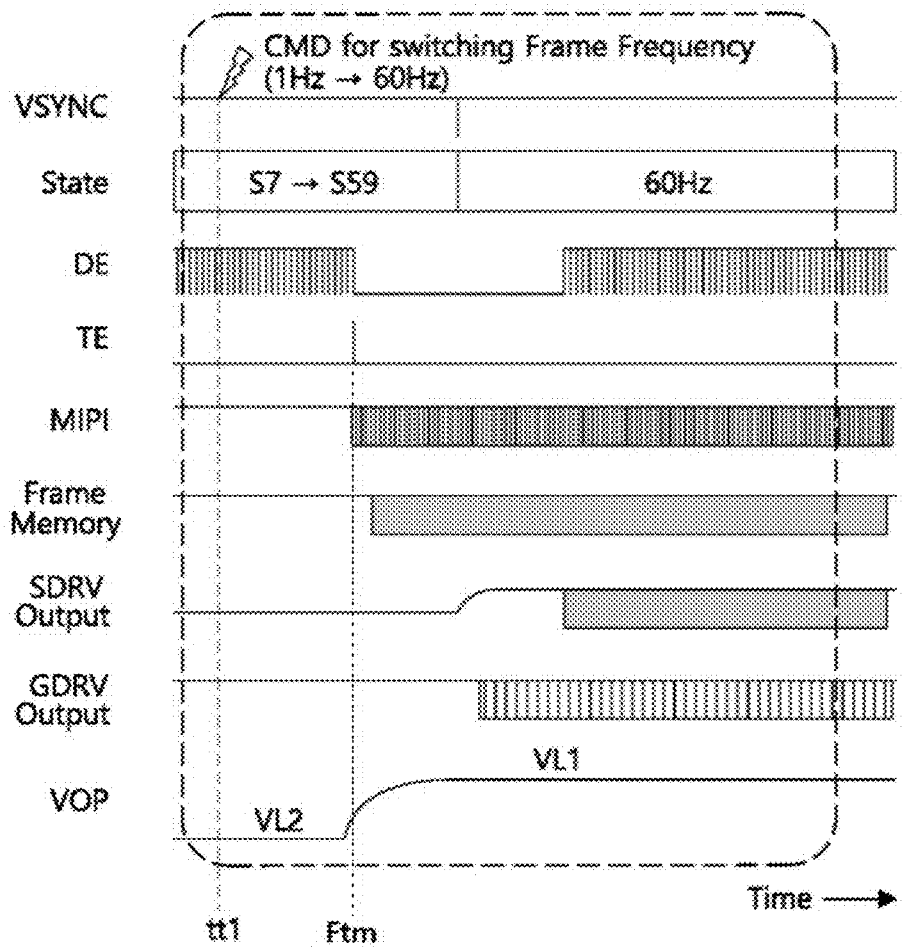
FIG. 11 (PRIOR ART)
FIGS. 11 and 12 are diagrams for describing a problem capable of occurring in varying a refresh rate on the basis of a time at which a frequency variation command signal of an interrupt type is received, in the comparative example of FIG. 10.
Figure 12:
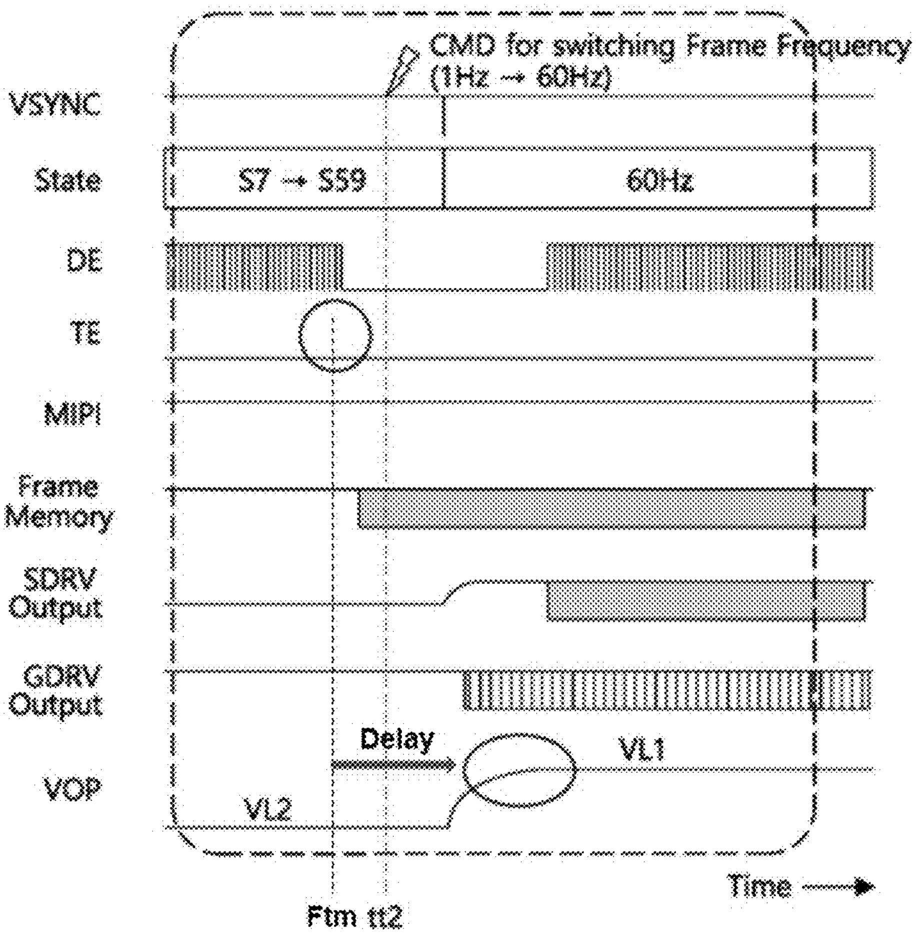
FIG. 12 (PRIOR ART)

FIG. 10 is a diagram showing a timing at which a refresh rate irregularly varies based on a frequency variation command signal of an interrupt type, in a comparative example of the present disclosure. FIGS. 11 and 12 are diagrams for describing a problem capable of occurring in varying a refresh rate on the basis of a time at which a frequency variation command signal of an interrupt type is received, in the comparative example of FIG. 10.

Referring to FIG. 10, a frequency variation command signal CMD of an interrupt type may be output when a variation of a second refresh rate is needed for sudden high-speed driving in the middle of performing low-speed driving based on a first refresh rate. That is, the frequency variation command signal CMD of an interrupt type is output to change the refresh rate prior to the low-speed driving completing. For example, the frequency variation command signal CMD of the interrupt type may be output when a processor 200 should suddenly update image data in the middle of performing a 1 Hz operation (for example, a screen change by a user, or a change by communication).

When a timing controller 303 varies a refresh rate after completing the 1 Hz operation, based on the frequency variation command signal CMD of the interrupt type, a time difference "several frames" or "tens of frames" may occur between a reception time of the command signal CMD and a variation time of the refresh rate. In one embodiment, the variation time of the refresh rate is the time when the refresh rate changes between a first refresh rate and second refresh rate. In order to solve such a problem, the timing controller 303 may identify interrupt information included in the frequency variation command signal CMD and may perform a variation operation of a refresh rate in a skip frame S7 during which the frequency variation command signal CMD is received, and thus, may irregularly vary the refresh rate before the 1 Hz operation is completed. In this case, the skip frame S7 where the variation operation of the refresh rate is performed may be a last skip frame, the first refresh rate may be in a state where 7.5 Hz instead of 1 Hz is completed. In the drawing, "S7-S59" may denote that the skip frame S7 is now the last skip frame, based on the frequency variation command signal CMD of the interrupt type even though skip frame S59 was the scheduled last skip frame.

In order to vary a frequency of the interrupt type, with respect to the reception time of the frequency variation command signal CMD in the skip frame S7, a transfer request signal TE should be transferred to the processor 200, and moreover, a time for shifting a pixel driving voltage VOP should be sufficient.

Unlike a normal type, the reception time of the frequency variation command signal CMD of the interrupt type may be received from the processor 200 at a random time in one frame. On the other hand, a generation-enabled time of the transfer request signal TE and a variation-enabled time of the pixel driving voltage VOP may be predefined as a specific timing of each frame with respect to a vertical synchronization signal VSYNC.

As in FIG. 11, in the skip frame S7, when a reception time tt1 of the frequency variation command signal CMD of the interrupt type is earlier than a predetermined specific timing Ftm, a frequency variation of the interrupt type may be stably performed.

On the other hand, as in FIG. 12, in the skip frame S7, when a reception time tt2 of the frequency variation command signal CMD of the interrupt type is later than the predetermined specific timing Ftm, the frequency variation of the interrupt type may not be stably performed.

To provide a detailed description thereof, because the transfer request signal TE is not generated after the reception time tt2 of the frequency variation command signal CMD in the skip frame S7, a next refresh frame may be performed without updating image data through the MIPI. Also, a variation VL of the pixel driving voltage VOP may not be performed in the skip frame S7 due to an insufficient time after the reception time tt2 of the frequency variation command signal CMD, and a variation time of the pixel driving voltage VOP (e.g., a time when the pixel driving voltage VOP changes) may be delayed to a next refresh frame.

When a frequency variation of the interrupt type is not stably performed, an interface timing associated with the transfer of an image signal may be delayed, and a variation time of the pixel driving voltage VOP may be delayed, causing image distortion.

Figure 13:
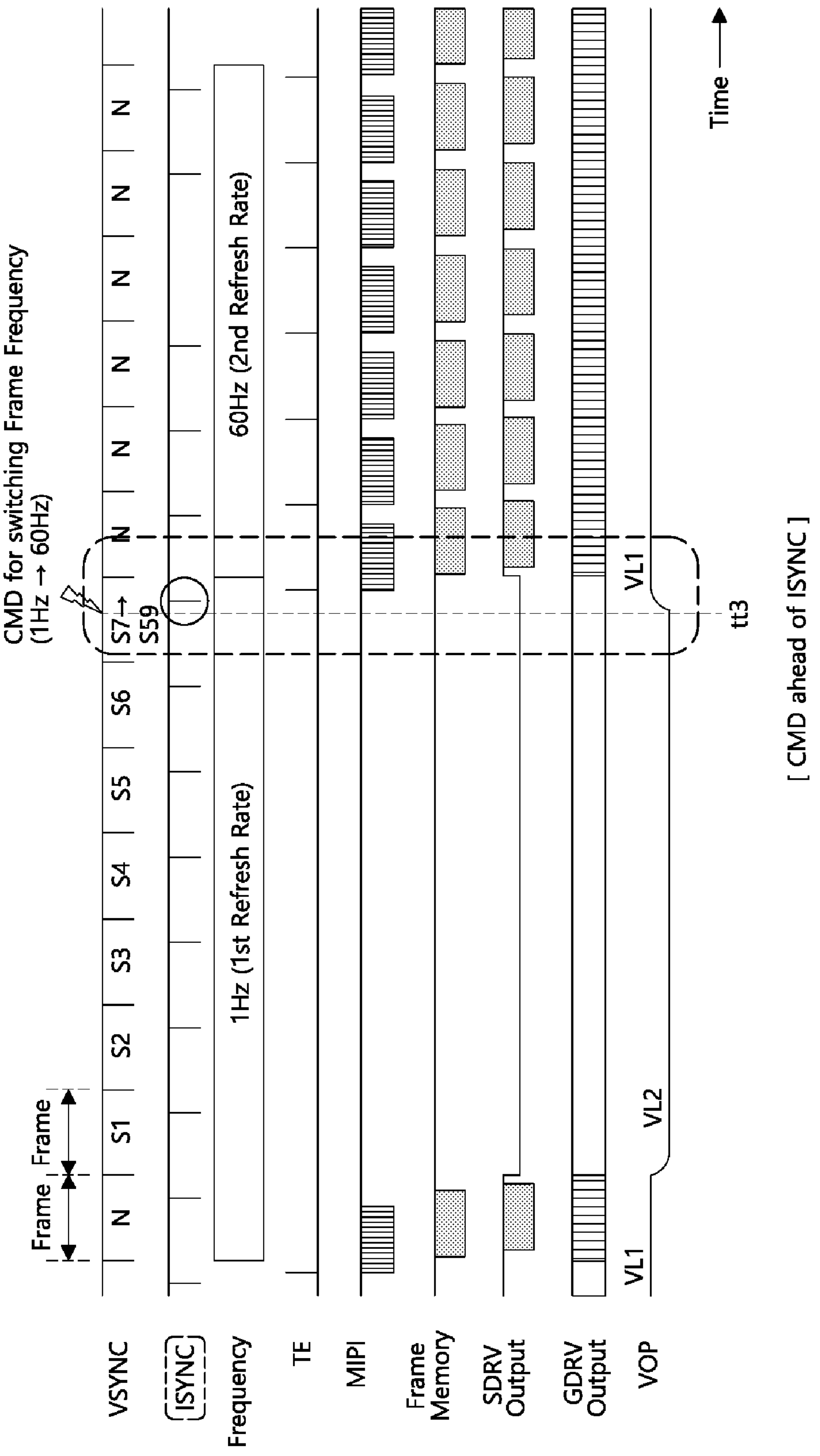
FIGS. 13 and 14 are diagrams showing a timing at which a refresh rate irregularly varies based on a frequency variation command signal of an interrupt type is received, according to an embodiment of the present disclosure.
Figure 14:
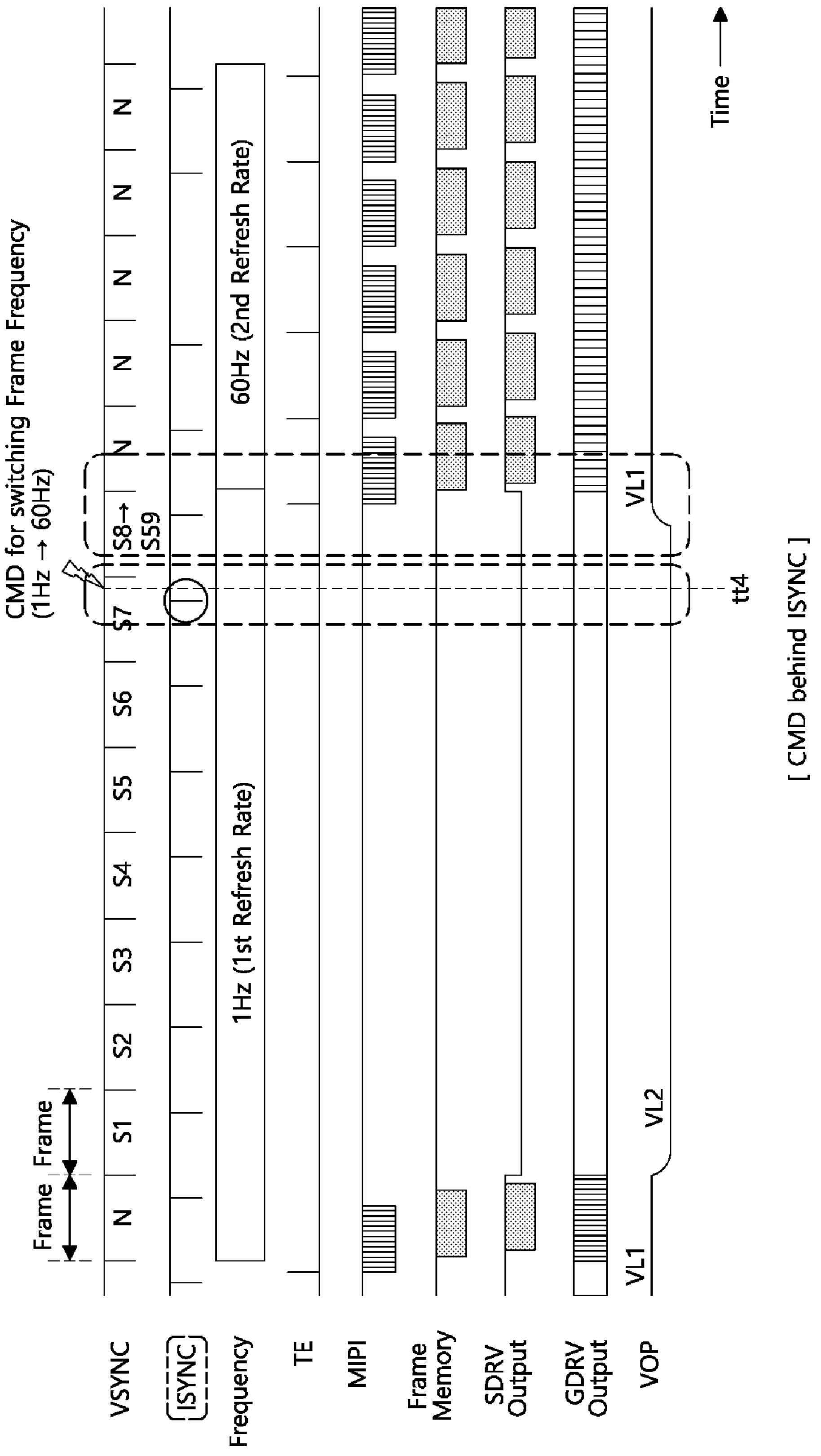
Figure 15:
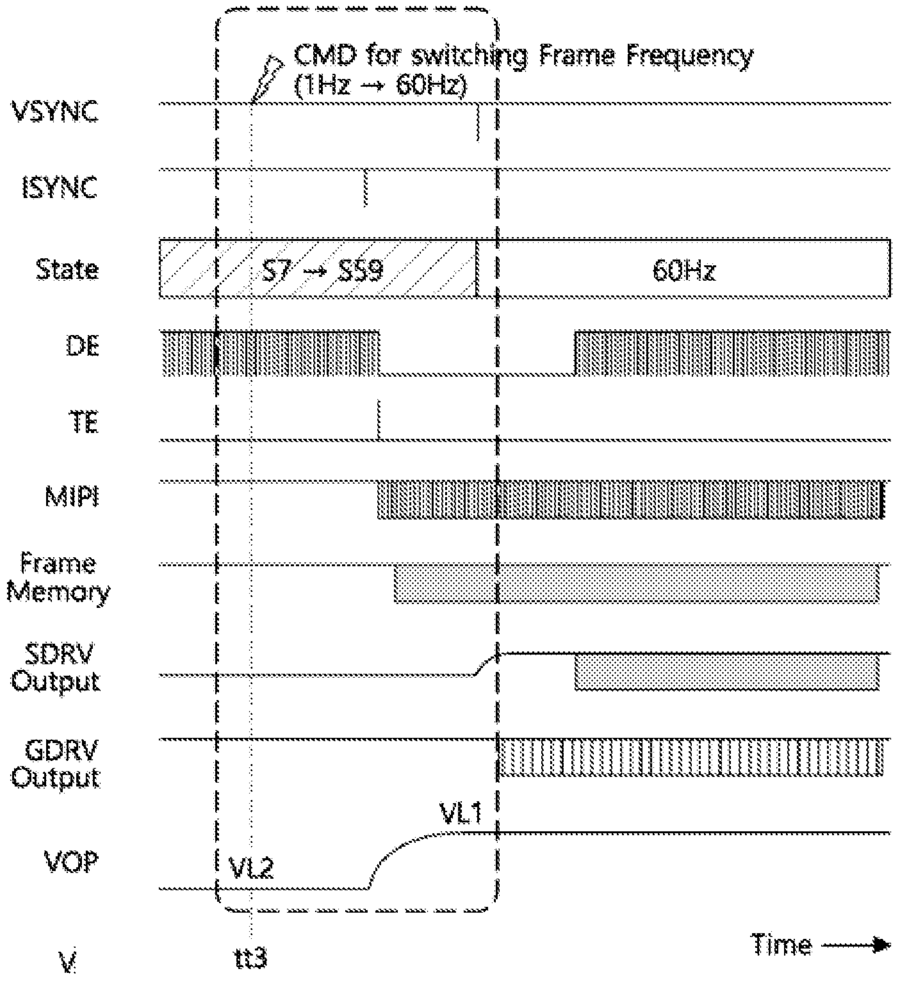
FIGS. 15 and 16 are diagrams showing another timing at which a refresh rate irregularly varies based on a frequency variation command signal of an interrupt type is received according to an embodiment of the present disclosure.
Figure 16:
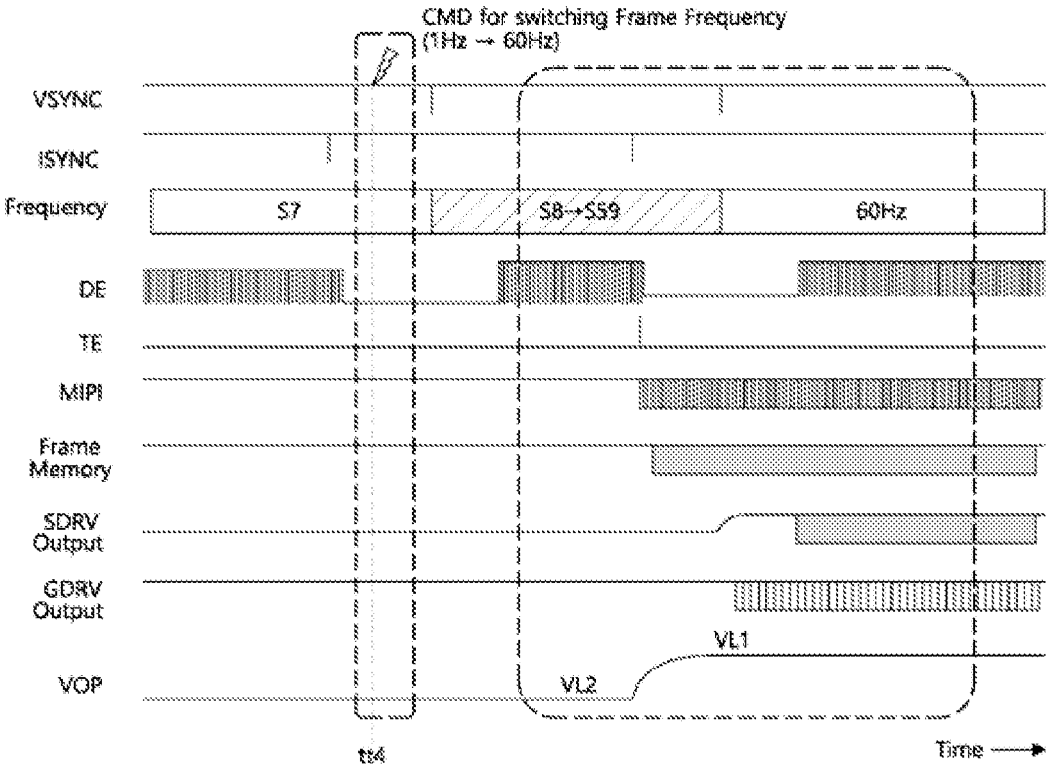

FIGS. 13 and 14 are diagrams showing a timing at which a refresh rate irregularly varies based on a frequency variation command signal of an interrupt type is received, in an embodiment of the present disclosure. FIGS. 15 and 16 are diagrams showing another timing at which a refresh rate irregularly varies based on a frequency variation command signal of an interrupt type is received, in an embodiment of the present disclosure.

Referring to FIGS. 13 to 16, a timing controller 303 according to the present embodiment may differently control a variation time of a refresh rate (e.g., a time when the refresh rate changes) for pixels on the basis of a temporal position of a frequency variation command signal CMD received from a processor 200, and thus, a frequency may stably vary even when the frequency variation command signal CMD is irregularly received, thereby preventing the distortion of an image.

When the frequency variation command signal CMD is received from the processor 200 in a last skip frame S59 among a plurality of skip frames S1 to S59, the timing controller 303 may control the variation time of the refresh rate, based on a vertical synchronization signal VSYNC. Also, when the frequency variation command signal CMD is received from the processor in a skip frame (for example, S7) that is prior to the last skip frame S59 among the plurality of skip frames S1 to S59, the timing controller 303 may control the variation time of the refresh rate, based on an interrupt synchronization signal ISYNC.

To this end, the timing controller 303 may further generate the interrupt synchronization signal ISYNC in addition to the vertical synchronization signal VSYNC. The vertical synchronization signal VSYNC may define the skip frames S1 to S59 and a refresh frame N. The vertical synchronization signal VSYNC may define a generation-enabled time of a transfer request signal TE and a variation-enabled time of a pixel driving voltage VOP in each frame. Based on a reception time of the frequency variation command signal CMD in the specific skip frame S7 that is prior to the last skip frame S59, the interrupt synchronization signal ISYNC may provide a criterion so that the variation time of the refresh rate is controlled in one of the specific skip frame S7 and the skip frame S8 subsequent thereto. To this end, a period of the interrupt synchronization signal ISYNC may be the same as that of the vertical synchronization signal VSYNC, but a phase of the interrupt synchronization signal ISYNC may differ from that of the vertical synchronization signal VSYNC. In order to provide an accurate criterion, the interrupt synchronization signal ISYNC may be synchronized with the generation-enabled time of the transfer request signal TE in each frame.

When a frequency variation command signal CMD of a normal type or an interrupt type is received from the processor 200 in the last skip frame S59, the timing controller 303 may operate as follows. In the last skip frame S59, based on the vertical synchronization signal VSYNC, the timing controller 303 may transfer, to the processor 200, a transfer request signal TE of new image data for refresh driving and may vary a pixel driving voltage VOP, which is to be supplied to pixels, based on refresh driving (VL2 to VL1), and may shift a refresh rate, based on the pixels, from a first refresh rate (1 Hz) to a second refresh rate (60 Hz).

When the frequency variation command signal CMD of the interrupt type is received from the processor in the specific skip frame S7 other than the last skip frame S59, the timing controller 303 may operate as follows. The timing controller 303 may differently control the variation time of the refresh rate on the basis of a temporal order relationship between the interrupt synchronization signal ISYNC and a reception time (tt3 of FIGS. 13 and 15 and tt4 of FIGS. 14 and 16) of the frequency variation command signal CMD in the specific skip frame S7, and thus, a frequency may stably vary even when the frequency variation command signal CMD is irregularly received, thereby preventing the distortion of an image.

When a reception time tt3 of the frequency variation command signal CMD is earlier than (e.g., before) the interrupt synchronization signal ISYNC in the specific skip frame S7 as in FIGS. 13 and 15, the timing controller 303 may operate as follows. In the specific skip frame S7, based on the interrupt synchronization signal ISYNC, the timing controller 303 may transfer, to the processor 200, the transfer request signal TE of new image data for refresh driving and may vary a pixel driving voltage VOP, which is to be supplied to pixels, based on refresh driving (VL2 to VL1), and may shift the refresh rate, based on the pixels, from the first refresh rate (1 Hz) to the second refresh rate (60 Hz). Thus, the pixels are driven at the second refresh rate during a second refresh frame during which second image data is applied to the pixels where the second refresh frame occurs after the specific skip frame (S7) without the pixels being driven at the first refresh rate during remaining skip frames (S8 to S59) that were scheduled to occur after the specific skip frame (S7).

When the reception time tt4 of the frequency variation command signal CMD is later than the interrupt synchronization signal ISYNC in the specific skip frame S7 as in FIGS. 14 and 16, the timing controller 303 may operate as follows. In a next skip frame S8 (e.g., a subsequent skip frame) continuously succeeding the specific skip frame S7, based on the interrupt synchronization signal ISYNC, the timing controller 303 may transfer, to the processor, the transfer request signal TE of new image data for refresh driving and may vary a pixel driving voltage VOP, which is to be supplied to pixels, based on refresh driving (VL2 to VL1), and may shift the refresh rate, based on the pixels, from the first refresh rate (1 Hz) to the second refresh rate (60 Hz). Thus, the pixels are driven at the second refresh rate during a second refresh frame where second image data is applied to the pixels. The second refresh frame occurs after the next skip frame (S8) without the pixels being driven at the first refresh rate during remaining skip frames (S9-S59) that were scheduled to occur after the next skip frame (S8).

Figure 17:
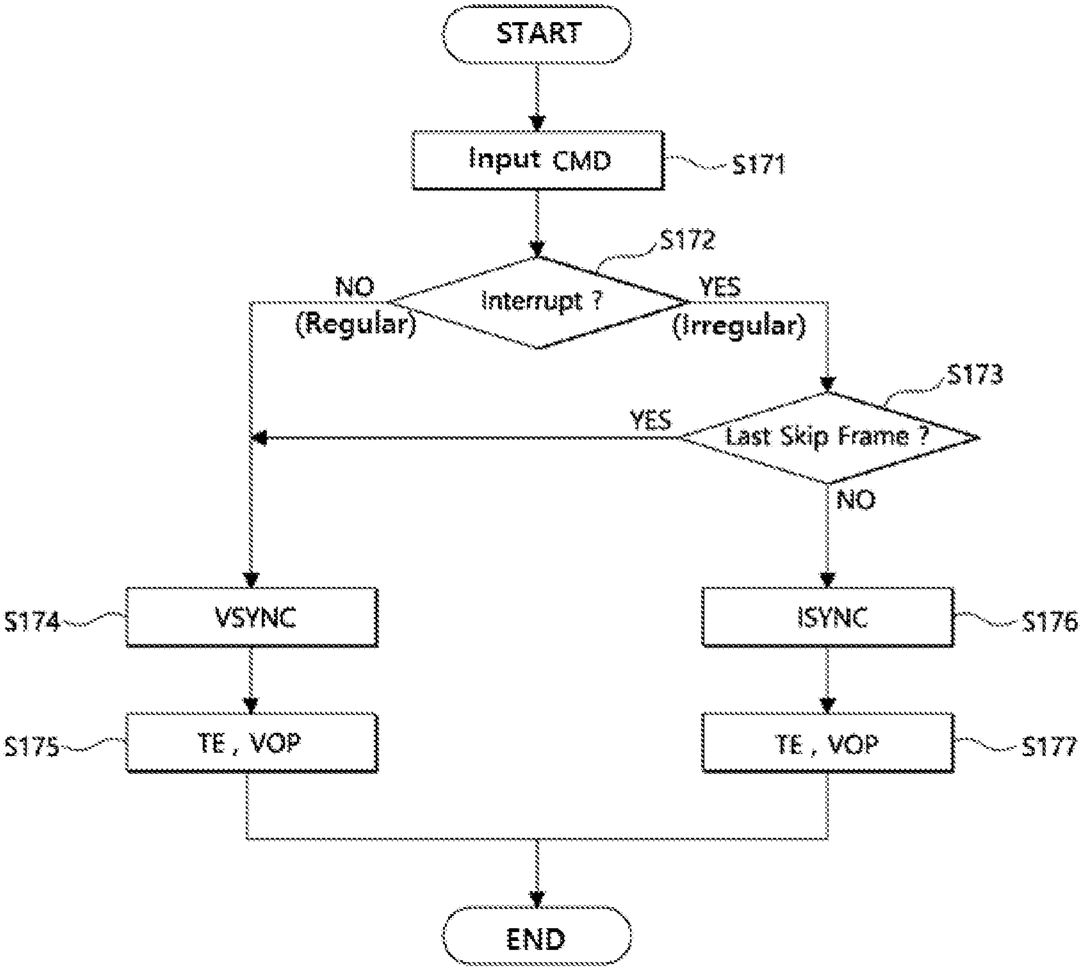
FIG. 17 is a diagram showing a driving method of a display apparatus according to an embodiment of the present disclosure.

FIG. 17 is a diagram showing a driving method of a display apparatus according to an embodiment of the present disclosure.

Referring to FIG. 17, the timing controller 303 may determine whether interrupt information is included in a frequency variation command signal CMD received from a processor 200, and thus, may determine whether the frequency variation command signal CMD is a normal type or an interrupt type (S171 and S172). The frequency variation command signal CMD of the normal type may be regularly received at a predetermined timing in low-speed driving, but the frequency variation command signal CMD of the interrupt type may be irregularly received at a sudden timing in low-speed driving The timing controller 303 may determine whether a timing, at which the frequency variation command signal CMD of the interrupt type is received, is arranged in a last skip frame included in one low-speed driving cycle or is arranged in a specific skip frame preceding the last skip frame (S173).

When the frequency variation command signal CMD of the normal type is received in low-speed driving, or the frequency variation command signal CMD of the interrupt type is received in the last skip frame in low-speed driving, the timing controller 303 may perform a variation operation of a refresh rate on the basis of a vertical synchronization signal VSYNC. That is, in the last skip frame, based on the vertical synchronization signal VSYNC, the timing controller 303 may transfer, to the processor 200, a transfer request signal TE of new image data for refresh driving and may vary a pixel driving voltage VOP, which is to be supplied to pixels, based on refresh driving, and may shift the refresh rate, based on the pixels, from a first refresh rate to a second refresh rate which is greater than the first refresh rate (S174 and S175).

When the frequency variation command signal CMD of the interrupt type is received in a specific skip frame preceding (e.g., before) the last skip frame, the timing controller 303 may perform a variation operation of a refresh rate on the basis of an interrupt synchronization signal ISYNC. The timing controller 303 may differently control the variation time of the refresh rate on the basis of a temporal order relationship between the interrupt synchronization signal ISYNC and a reception time of the frequency variation command signal CMD in the specific skip frame, and thus, even when the frequency variation command signal CMD is irregularly received, the timing controller 303 may perform an overall operation associated with the transfer of the transfer request signal TE and a variation of the pixel driving voltage VOP to enable a frequency to stably vary (S176 and S177). This has been described above with reference to FIGS. 13 to 16.

The present embodiment may realize the following effects.

In the present embodiment, an interrupt synchronization signal which has the same period and a different phase compared to a vertical synchronization signal may be separately generated and a variation time of a refresh rate for pixels may be differently controlled based on the interrupt synchronization signal on the basis of a temporal position of a frequency variation command signal received from a processor, and thus, a frequency may stably vary even when the frequency variation command signal is irregularly received, thereby preventing the distortion of an image.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A display apparatus comprising:

a display panel including a plurality of pixels, the plurality of pixels configured to be variably driven between a first refresh rate and a second refresh rate which is different from the first refresh rate;

a processor configured to output a frequency variation command signal indicative of a request to switch between the first refresh rate and the second refresh rate; and a timing controller configured to differently control a time when a refresh rate of the plurality of pixels changes between the first refresh rate and the second refresh rate based on a temporal position of the frequency variation command signal received from the processor, wherein responsive to the timing controller receiving the frequency variation command signal during a last skip frame among a plurality of skip frames, the timing controller is configured to control the time when the refresh rate for the plurality of pixels changes between the first refresh rate and the second refresh rate according to a first synchronization signal, wherein responsive to the timing controller receiving the frequency variation command signal during a skip frame from among the plurality of skip frames that is prior to the last skip frame, the timing controller is configured to control the time when the refresh rate for the plurality of pixels changes between the first refresh rate and the second refresh rate according to a second synchronization signal, wherein the first synchronization signal and the second synchronization signal have a same period and different phases from each other, and wherein an operation of applying image data to the plurality of pixels is stopped during the plurality of skip frames.

2. The display apparatus of claim 1, wherein the plurality of pixels are driven at the first refresh rate during a first refresh frame and the plurality of skip frames that are differentiated from one another with respect to a first synchronization signal, and the plurality of pixels are driven at the second refresh rate during a plurality of second refresh frames that are differentiated from one another with respect to the first synchronization signal, and wherein first image data is applied to the plurality of pixels during the first refresh frame, and the first image data is maintained in the plurality of pixels during at least one of the plurality of skip frames.

3. The display apparatus of claim 1, wherein responsive to the timing controller receiving the frequency variation command signal during the last skip frame, the timing controller is configured to output a transfer request signal to the processor for second image data for refresh driving, varies an initialization voltage of a light emitting device applied to the plurality of pixels from a first voltage to a second voltage, and changes the refresh rate from the first refresh rate to the second refresh rate that is greater than the first refresh rate during the last skip frame based on the first synchronization signal.

4. The display apparatus of claim 1, wherein responsive to the timing controller receiving the frequency variation command signal during the skip frame that is prior to the last skip frame, the timing controller differently controls the time when the refresh rate changes between the first refresh rate and the second refresh rate based on whether the frequency variation command signal was received during the skip frame prior to the second synchronization signal or whether the frequency variation command signal was received during the skip frame after the second synchronization signal.

5. The display apparatus of claim 4, wherein responsive to the frequency variation command signal being received during the skip frame prior to the second synchronization signal, the timing controller is configured to output a transfer request signal to the processor for second image data for refresh driving, varies an initialization voltage of a light emitting device applied to the plurality of pixels from a first voltage to a second voltage, and changes the refresh rate from the first refresh rate to the second refresh rate that is greater than the first refresh rate during the skip frame based on the second synchronization signal.

6. The display apparatus of claim 4, wherein responsive to the frequency variation command signal being received during the skip frame after the second synchronization signal, the timing controller is configured to output a transfer request signal to the processor for second image data for refresh driving, varies an initialization voltage of a light emitting device applied to the plurality of pixels from a first voltage to a second voltage, and changes the refresh rate from the first refresh rate to the second refresh rate that is greater than the first refresh rate during another skip frame that is subsequent the skip frame in the plurality of skip frames based on the second synchronization signal.

7. A driving method of a display apparatus including a plurality of pixels that are configured to be variably driven between a first refresh rate and a second refresh rate that is different from the first refresh rate, the driving method comprising:

outputting, by a processor of the display apparatus, a frequency variation command signal to a timing controller of the display apparatus, the frequency variation command signal indicative of a request to switch between the first refresh rate and the second refresh rate; and differently controlling, by the timing controller, a time when a refresh rate of the plurality of pixels changes between the first refresh rate and the second refresh rate based on a temporal position of the frequency variation command signal received from the processor, wherein differently controlling the time when the refresh rate changes comprises:

responsive to the timing controller receiving the frequency variation command signal during a last skip frame among a plurality of skip frames, controlling, by the timing controller, the time when the refresh rate for the plurality of pixels changes between the first refresh rate and the second refresh rate according to a first synchronization signal; and responsive to the timing controller receiving the frequency variation command signal during a skip frame from among the plurality of skip frames that is prior to the last skip frame, controlling, by the timing controller, the time when the refresh rate for the plurality of pixels changes between the first refresh rate and the second refresh rate according to a second synchronization signal, wherein the first synchronization signal and the second synchronization signal have a same period and different phases from each other, and wherein an operation of applying image data to the plurality of pixels is stopped during the plurality of skip frames.

8. The driving method of claim 7, wherein the plurality of pixels are driven at the first refresh rate during a first refresh frame and the plurality of skip frames that are differentiated from one another with respect to a first synchronization signal, and the plurality of pixels are driven at the second refresh rate during a plurality of second refresh frames that are differentiated from one another with respect to the first synchronization signal, and wherein first image data is applied to the plurality of pixels during the first refresh frame, and the first image data is maintained in the plurality of pixels during at least one of the plurality of skip frames.

9. The driving method of claim 7, wherein controlling the time when the refresh rate changes according to the first synchronization signal comprises:

determining, by the processor, that the frequency variation command signal is received from the processor during the last skip frame; and outputting a transfer request signal to the processor for second image data for refresh driving, varying an initialization voltage of a light emitting device applied to the plurality of pixels from a first voltage to a second voltage, and changing the refresh rate from the first refresh rate to the second refresh rate that is greater than the first refresh rate during the last skip frame based on the first synchronization signal.

10. The driving method of claim 7, wherein controlling the time when the refresh rate changes according to the second synchronization signal comprises:

determining, by the timing controller, that the frequency variation command signal is received during the skip frame that is prior to the last skip frame; and differently controlling, by the timing controller, the time when the refresh rate changes between the first refresh rate and the second refresh rate based on whether the frequency variation command signal was received during the skip frame prior to the second synchronization signal or whether the frequency variation command signal was received during the skip frame after the second synchronization signal.

11. A display device comprising:

a display panel including a plurality of pixels that are configured to be driven between a first refresh rate and a second refresh rate which is different from the first refresh rate, the plurality of pixels driven at the first refresh rate during a first refresh frame during which first image data is applied to the plurality of pixels and during a plurality of skip frames during which the first image data is maintained in the plurality of pixels, the first refresh frame and each of the plurality of skip frames defined by a first synchronization signal; and a timing controller configured to receive a frequency variation control signal indicative of a request to switch between the first refresh rate and the second refresh rate where the request is received during a skip frame that is prior to a last skip frame from amongst the plurality of skip frames, and control a time when a refresh rate of the plurality of pixels changes between the first refresh rate and the second refresh rate based on when the frequency variation control signal is received with respect to a second synchronization signal that is different from the first synchronization signal.

12. The display device of claim 11, wherein the timing controller is configured to control the time when the refresh rate of the plurality of pixels changes between the first refresh rate and the second refresh rate to occur before completion of all of the plurality of skip frames.

13. The display device of claim 11, wherein the second refresh rate is faster than the first refresh rate.

14. The display device of claim 13, wherein responsive to the frequency variation control signal being received during the skip frame prior to the second synchronization signal during the skip frame, the timing controller is configured to output a transfer request signal to a processor for second image data for refresh driving during a second refresh frame, varies a pixel driving voltage applied to the plurality of pixels from a first voltage to a second voltage that is greater than the first voltage, and changes the refresh rate from the first refresh rate during the skip frame based on the second synchronization signal.

15. The display device of claim 14, wherein the plurality of pixels are driven at the second refresh rate during the second refresh frame during which the second image data is applied to the plurality of pixels, the second refresh frame occurring after the skip frame without the plurality of pixels being driven at the first refresh rate during remaining skip frames from the plurality of skip frames that were scheduled to occur after the skip frame.

16. The display device of claim 13, wherein responsive to the frequency variation control signal being received during the skip frame after the second synchronization signal during the skip frame, the timing controller is configured to output a transfer request signal to a processor for second image data for refresh driving during a second refresh frame, varies a pixel driving voltage applied to the plurality of pixels from a first voltage to a second voltage that is greater than the first voltage, and changes the refresh rate from the first refresh rate to the second refresh rate during another skip frame that is subsequent the skip frame in the plurality of skip frames based on the second synchronization signal.

17. The display device of claim 16, wherein the plurality of pixels are driven at the second refresh rate during the second refresh frame during which the second image data is applied to the plurality of pixels, the second refresh frame occurring after the other skip frame without the plurality of pixels being driven at the first refresh rate during remaining skip frames from the plurality of skip frames that were scheduled to occur after the other skip frame.

18. The display device of claim 11, wherein the first synchronization signal has a period that is a same as a period of the second synchronization signal, and the first synchronization signal has a phase that is different from a phase of the second synchronization signal.

* * * * *